United States Patent [19]

Arndt

[11] 4,296,520
[45] Oct. 27, 1981

[54] PIN CONNECTOR

[75] Inventor: John J. Arndt, Chesterton, Ind.

[73] Assignee: The Anderson Company of Indiana, Gary, Ind.

[21] Appl. No.: 83,512

[22] Filed: Oct. 10, 1979

[51] Int. Cl.³ .............................................. B60S 1/40
[52] U.S. Cl. .................................... 15/250.32; 403/12
[58] Field of Search ....................... 15/250.31–250.42; 403/12; 24/82, 83, 139, 155 CC; 29/416; 206/231, 338

[56] References Cited

U.S. PATENT DOCUMENTS

| | | | |
|---|---|---|---|
| 723,853 | 3/1903 | Fleeger | 24/155 CC |
| 1,431,869 | 10/1922 | Bergen | 206/231 |
| 3,378,874 | 4/1968 | Scinta | 15/250.32 |
| 3,588,941 | 6/1971 | Schlesinger | 15/250.32 |
| 4,114,227 | 9/1978 | Blackman | 15/250.32 |
| 4,118,825 | 10/1978 | Hoebrechts et al. | 15/250.32 |

FOREIGN PATENT DOCUMENTS 2306218  2/1973  Fed. Rep. of Germany .
756069  8/1956  United Kingdom .................. 403/12

Primary Examiner—Peter Feldman
Attorney, Agent, or Firm—Wegner, Stellman, McCord, Wood & Dalton

[57] ABSTRACT

A pin (18) is provided for attaching a connector or an adaptor (16) to a wiper blade (10). The pin (18) has a novel head (70) on one end portion which has spaced tangs or tabs (72) depending therefrom. The spaced tangs or tabs (72) nest in slots (44) provided on the connector or on the adaptor (16) to retain the pin (18) in a piggyback manner on the connector or adaptor (16) during shipment and storage. Securing the pin (18) on the connector or adaptor (16) prevents losing or misplacing the pin (18) until it is ready for use in attaching the connector or adaptor (16) to the blade (10).

6 Claims, 5 Drawing Figures

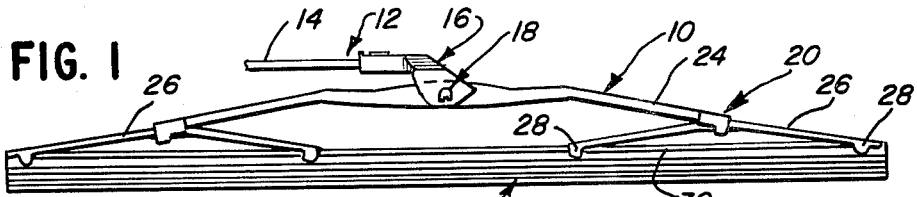
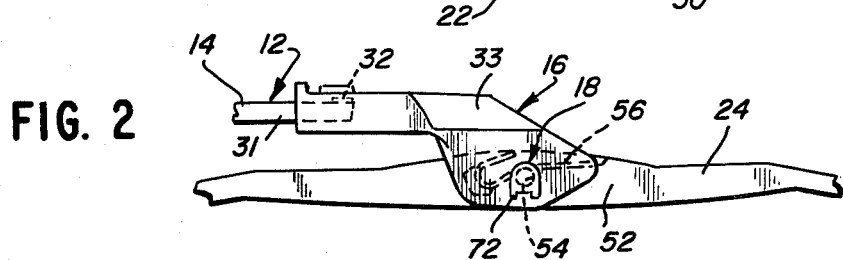
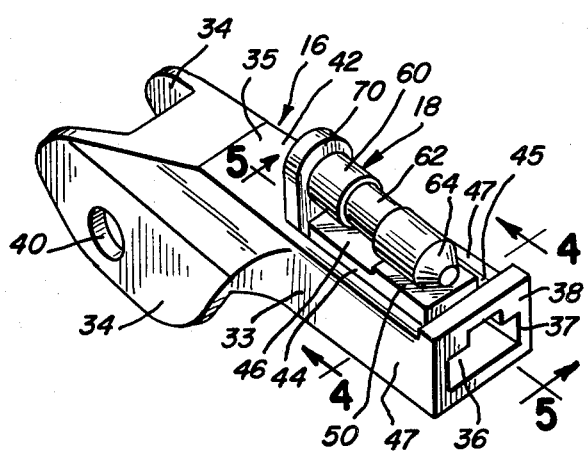
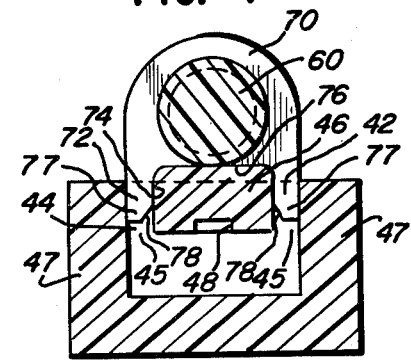
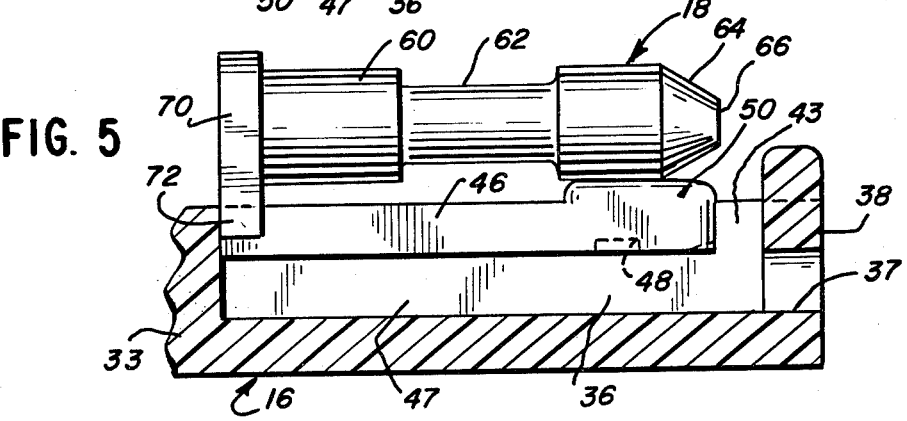

PIN CONNECTOR

DESCRIPTION

Technical Field

This invention relates to windshield wiper blades and arms and, more particularly, to a pin for connecting an adaptor to a wiper blade for connection to a wiper arm.

BACKGROUND ART

Traditionally, windshield wiper blades have been removable from the connectors on the end of a windshield wiper arm. Many different connectors have been developed for the ends of wiper arms which, at the time they were developed, had mating connections on the backs of the wiper blades which were intended for use with that particular connector. In order to make it possible to connect the connector of one particular type of wiper arm with a blade having a connection for connecting to a different type connector on a wiper arm, adaptors have been provided which convert one type of arm end for connection to a certain type of wiper blade.

One such type connector and/or adaptor has a pair of spaced apart flanges which are intended to straddle the yoke of a wiper blade so that a pin may be passed through the yoke and through the connection on the blade to retain the arm connected to the blade. Heretofore, the particular pin provided was a cylindrically-shaped pin having an annular recessed section in the midportion of the pin. When the pin was inserted through the openings in the flanges on the connector or adaptor and passed through aligned openings in the walls of the yoke of the blade, a spring clip in the yoke on the blade seated in the annular recess to retain the pin and, therefore, the connector and/or adaptor assembled with the blade.

These pins were generally made of metal, although they could be made of plastic and were taped to the connector or to the adaptor, or they were provided in small plastic bags attached to the connector or the adaptor, or they were molded in the current popular blister pack with the connector or adaptor. The pins frequently became separated from the adaptor or punctured the bag or the film of the blister pack and became lost, thereby rendering the blade useless with the particular connector and/or adaptor. In some cases, the manufacturer actually assembled the adaptor to the blade using the pin so as to attempt to prevent the pin from becoming lost. This increased the size of the blade presenting packaging problems and increased the cost of manufacturing the blade due to the additional step of assembling the adaptor and pin to the blade.

In the field, if the adaptor and pin are not needed, they are discarded. When needed, both are important and the connection becomes useless without one or the other.

The present invention is directed to overcoming one or more of the problems as set forth above.

DISCLOSURE OF INVENTION

The present invention is directed to the use of an improved form of pin for connecting a connector or adaptor to a wiper blade so as to convert a crosspin-type blade for use on an arm having either the double-flanged connector or an adaptor for converting a straight end connector to a double-flanged connector. The improved pin has a shoulder or head on one end which projects radially beyond the cylindrically-shaped body of the pin and has transversely extending tabs which are adapted to be inserted in one or more slots formed on the connector or on the adaptor so that the pin is held in a piggyback fashion on the connector or on the adaptor during storage and shipment. This prevents the pin from becoming lost.

In one preferred form, the tabs on the pin are spaced apart and are press fit into slots defining a latching member of the adaptor with the body of the pin lying parallel to and on top of the latching member. The adaptor shields the pin to prevent it from puncturing through the film of a blister pack or through a bag.

BRIEF DESCRIPTION OF DRAWINGS

FIG. 1 is a side elevational view of a windshield wiper blade including an adaptor assembled to the blade using the improved pin of the present invention;

FIG. 2 is an enlarged side elevational view of the adaptor and pin connecting the arm to the blade;

FIG. 3 is a perspective view of the adaptor with the improved pin assembled thereto in a piggyback fashion;

FIG. 4 is a cross-sectional view taken along the line 4—4 of FIG. 3; and

FIG. 5 is a partial sectional view taken along the line 5—5 of FIG. 3.

BEST MODE FOR CARRYING OUT THE INVENTION

The windshield wiper blade assembly 10 is shown connected to the connector end 12 of a windshield wiper arm 14 by means of an adaptor 16 and a pin 18. In the form illustrated, the windshield wiper blade 10 is comprised of a superstructure 20 and a resilient wiping element 22. The superstructure 20 is comprised of a primary yoke 24 pivotally connected to a pair of secondary yokes 26 which have claws 28 engaging with a flexible backing strip 30 of the resilient wiping element 22. The windshield wiper arm 14, in the form shown, has a straight end portion 31 upon which is formed a lug or stud 32 (FIG. 2).

The adaptor 16, in the embodiment shown, is a unitary elongate molded housing 33 composed of a strong resilient plastic material, such as polycarbonate resin, or the like, and has a pair of similarly shaped side flanges 34 projecting downwardly from one end portion 35 thereof. The housing 33 extends along a longitudinal axis parallel to the planes of the side flanges 34 and perpendicular to an axis extending between the aligned apertures 40 formed in said side flanges 34. A cavity 36 is symmetrical with the axis of the housing 33 and is aligned with an opening 37 in the end wall 38 of the housing 33. A top wall 42 of the housing 33 has a U-shaped slot 44 cut therethrough with the base 43 of the "U" located near the end wall 38 and with the legs 45 of the "U" lying parallel to side walls 47 of the housing 33. A latching member 46 is defined by the U-shaped slot 44 and is joined integrally to the top wall 42 at a location spaced from the end wall 38 of the housing 33. The latching member 46 has a free end portion 50 which is resiliently positioned in the slot 44 and has a cutout or aperture 48 formed in the undersurface of the end portion 50. The connector end 12 of the wiper arm 14 is a straight end 31 which is inserted through the opening 37 in the end wall 38 of the housing 33 so that the lug 32 on the straight end portion 31 of arm 14 will seat in the aperture 48 in the latching member 46 to retain the arm 14 and adaptor 16 assembled.

The primary yoke 24 of the wiper blade 10 has a pair of spaced apart walls 52 which have aligned openings 54 therethrough. A spring clip 56 is retained in the primary yoke 24 and has a portion overlapping the aligned openings 54. Any form of spring clip which intersects the aligned openings 54 in the side walls is acceptable. Many different spring clip connections on wiper blades are available on the market, all of which are capable of being used with the present invention. The present invention is not intended to in any way cover the construction of a wiper blade having a spring clip for retaining an arm end assembled with a wiper blade.

The connector pin 18 is comprised of a cylindrical body portion 60 having an annular recessed portion 62 substantially midway between the ends of the pin. One end of the pin 18 has a tapered terminal end portion 64, which taper is truncated to form a snub nose 66. The other end of the pin 18 has an enlarged diameter head portion 70 which projects radially outward beyond the surface of the body portion 60 throughout a major peripheral portion of the pin. The head portion 70 has a pair of tangs or tabs 72 lying in the plane of the head and extending outwardly along parallel tangents to the round portion of the head. The tangs or tabs 72 are spaced apart and have a cutout portion 74 therebetween with the base 76 of the cutout portion 74 substantially aligning with the surface of the body portion 60 of the pin 18. The spacing between the tabs 72 is designed to substantially correspond with the width of the latch member 46 of the adaptor 16. The outer end portions 77 of the tabs 72 are tapered on the inwardly facing edges thereof at 78 which form guides for the tabs 72.

The pin 18 is assembled in a piggyback fashion on the adaptor 16 by inserting the tabs 72 into the legs 45 of the slot 44 with the latching member 46 of the adaptor 16 fitting into the cutout portion 74 between the tabs 72. The size of the tabs 72 is such as to require a force fit to seat the tabs 72 in the legs 45 of the slot 44 between the walls of the latching member 46 and the outer side walls 47 of the housing 33 so ,s to retain the pin 18 assembled with the adaptor 16. The force required to separate the pin 18 from the adaptor 16 is more than a nominal force so as to prevent the pin 18 from separating upon being jostled or dropped. The body portion 60 of the pin 18 bears against the raised free end portion 50 of the latching member 46 as a support therefor.

Industrial Applicability

The adaptor 16 and pin 18 are manufactured and are assembled with the tabs 72 of the pin 18 seated in the legs 45 of the slot 44. Two such combined units are then included in a box with a pair of wiper blades having a spring clip 56 type connector on the yoke. The purchaser can use the adaptor 16 and pin 18 to assemble a straight end wiper arm to a blade in the box. Using the improved construction of the pin 18, it is not necessary to tape the pin 18 to the connector, nor is it necessary to assemble the adaptor 16 to the blade at the factory as was done on occasion heretofore. With the improved pin 18 assembled on the adaptor 16, the pin 18 will not be lost when the box is opened because the pin and adaptor will come out of the box together. It is only necessary for the installer to grasp and remove the pin 18 from the adaptor 16, align the side flanges 34 of the adaptor 16 with the side walls of the blade and insert the pin 18 through the aligned apertures 40 and 54 until the spring clip 56 seats in the annular recess portion 62. In the event the arm end is of a different type than a straight end arm, the adaptor 16 will then be discarded along with the pin 18. Since the pin 18 is not bagged separately, it is not likely to become lost. The adaptor 16 with pin 18, assembled in a piggyback fashion, can be molded into a blister pack whereupon the pin 18 will not cut through the skin of the blister pack and, therefore, is not likely to become lost.

Other aspects, objects and advantages of this invention can be obtained from a study of the drawings, the disclosure and the appended claims.

I claim:

1. A pin (18) having a cylindrically-shaped body portion (60) for attaching an adaptor (16) to a wiper blade (10), said body portion (60) having an annular recessed midportion (62), a head (70) on one end of said pin (18) extending radially outward from said body portion (60), and a pair of spaced apart tabs (72) lying in the plane of said head (70) and extending parallel to each other in an outward direction from said body portion (60) for retaining said pin (18) on said adaptor (16) prior to use.

2. A pin (18) as claimed in claim 1 wherein said adaptor (16) has a pair of spaced apart slots (44) in which said tabs (72) nest.

3. A pin (18) as claimed in claim 1 wherein said adaptor (16) has a latch member (46) attached to a housing (33), said latch member (46) being spaced from said housing (33) to form a slot (44) on either side of said latch (46), said tabs (72) on said head (70) seating in said slots (44) as said head (70) spans across said latch member (46) with the body portion (60) of said pin (18) resting on said latch member (46).

4. A pin (18) for attaching a wiper blade (10) to a connection on a wiper arm (14), said pin (18) having a body portion (60) with a recessed midportion (62) in which a spring clip (56) carried by the wiper blade (10) seats when said pin (18) attaches said arm (14) to said blade (10), a head (70) on one end of said pin (18) extending radially outward from said body portion (60), and a pair of spaced apart tabs (72) lying in the plane of said head (70) and extending parallel to each other in an outward direction from said body portion (60) for retaining said pin (18) on said connection prior to use on a blade.

5. A pin (18) as claimed in claim 4 wherein said connection is an adaptor (16) having a latch member (46) defining a pair of slots (44) with parts of said adaptor (16), said tabs (72) seating in said slots (44) with said head (70) spanning said latch member (46) for retaining said pin (18) on said adaptor (16) prior to use in connecting the adaptor (16) to the blade (10).

6. A pin (18) having a body portion (60) for attaching an adaptor (16) to a wiper blade (10), said body portion (60) having a recessed midportion (62) in which a spring (56) carried by the wiper blade (10) seats when said pin (18) attaches said adaptor (16) to said wiper blade (10), a head (70) on one end of said pin (18) extending radially outward from said body portion (60), and a pair of spaced apart tabs (72) extending from said head (70) and lying in the plane of said head (70), said tabs (72) seating in a pair of spaced apart slots (44) formed in said adaptor (16) with the axis of the pin (18) lying parallel to the axis of said adaptor (16) for retaining said pin (18) on said adaptor (16) prior to use.

* * * * *